(12) United States Patent  
Blair

(10) Patent No.: US 6,481,671 B1
(45) Date of Patent: Nov. 19, 2002

(54) SPACECRAFT SUNSHIELD FOR USE IN PERFORMING SOLAR TORQUE BALANCING

(75) Inventor: Mark A. Blair, Broomfield, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 32 days.

(21) Appl. No.: 09/638,841

(22) Filed: Aug. 14, 2000

(51) Int. Cl.⁷ .................................................. B64G 1/24
(52) U.S. Cl. ...................... 244/168; 244/164; 244/173
(58) Field of Search ................................ 244/168, 173, 244/164

(56) References Cited

U.S. PATENT DOCUMENTS

| | | | |
|---|---|---|---|
| 4,375,878 A | 3/1983 | Harvey et al. | 244/158 R |
| 4,591,116 A * | 5/1986 | Guenther et al. | 244/168 |
| 4,684,084 A | 8/1987 | Fuldner et al. | 244/168 |
| 4,725,023 A | 2/1988 | Shiki | 244/158 A |
| 4,747,567 A | 5/1988 | Johnson et al. | 244/173 |
| 4,759,517 A * | 7/1988 | Clark | 244/168 |
| 4,834,325 A | 5/1989 | Faget et al. | 244/173 |
| 4,949,922 A | 8/1990 | Rosen | 244/168 |
| 5,067,672 A | 11/1991 | Bouzat | 244/158 R |
| 5,129,600 A | 7/1992 | Polites | 244/158 R |
| 5,152,482 A | 10/1992 | Perkins et al. | 244/158 R |
| 5,211,360 A | 5/1993 | Zimbelman | 244/164 |
| 5,305,971 A | 4/1994 | Decanini | 244/168 |
| 5,310,144 A | 5/1994 | Salvatore et al. | 244/168 |
| 5,312,073 A | 5/1994 | Flament et al. | 244/168 |
| 5,520,359 A | 5/1996 | Merhav et al. | 244/158 R |
| 5,582,367 A | 12/1996 | Castiel et al. | 244/158 R |
| 5,618,012 A | 4/1997 | Lehner et al. | 244/168 |
| 5,626,315 A | 5/1997 | Flament et al. | 244/168 |
| 5,641,135 A | 6/1997 | Stuart et al. | 244/173 |
| 5,669,586 A | 9/1997 | Tadros | 244/167 |
| 5,687,933 A | 11/1997 | Goodzeit et al. | 244/169 |
| 5,697,582 A * | 12/1997 | Surauer et al. | 244/168 |
| 5,788,188 A | 8/1998 | Damilano | 244/165 |
| 5,895,014 A | 4/1999 | Sullivan | 244/168 |
| 5,927,654 A | 7/1999 | Foley et al. | 244/173 |
| 5,931,418 A | 8/1999 | Eller et al. | 244/158 A |
| 6,003,817 A * | 12/1999 | Basuthakur et al. | 244/168 |
| 6,164,597 A * | 12/2000 | Barker et al. | 244/168 |
| 6,189,835 B1 * | 2/2001 | Kaufman | 244/168 |

* cited by examiner

Primary Examiner—J. Woodrow Eldred
(74) Attorney, Agent, or Firm—Sheridan Ross P.C.

(57) ABSTRACT

A spacecraft includes an articulating sunshield assembly that is capable of simultaneously performing thermal control functions and solar torque balancing for the spacecraft. The sunshield assembly includes a pair of shield members that can be controllably positioned as the spacecraft orbits about a primary body. Control functionality is provided for periodically adjusting the positions of the shield members to maintain a neutral solar torque stability condition for the spacecraft. In one embodiment, solar torque balancing is performed in each of three independent rotational directions or planes (i.e., roll, pitch, and yaw) using the sunshield assembly. Functionality is also provided for performing momentum dumping tasks using the sunshield assembly in place of, or in conjunction with, on-board thrusters.

20 Claims, 6 Drawing Sheets

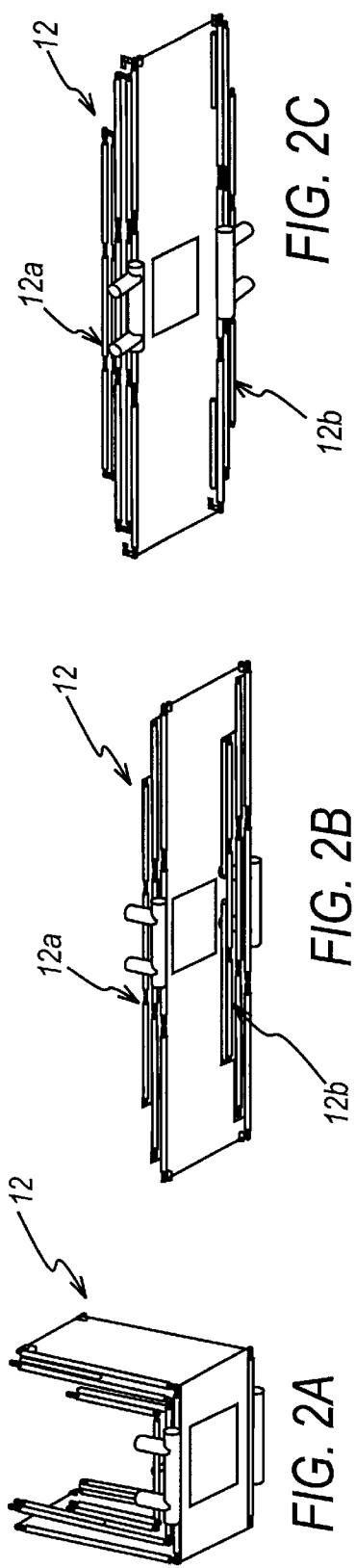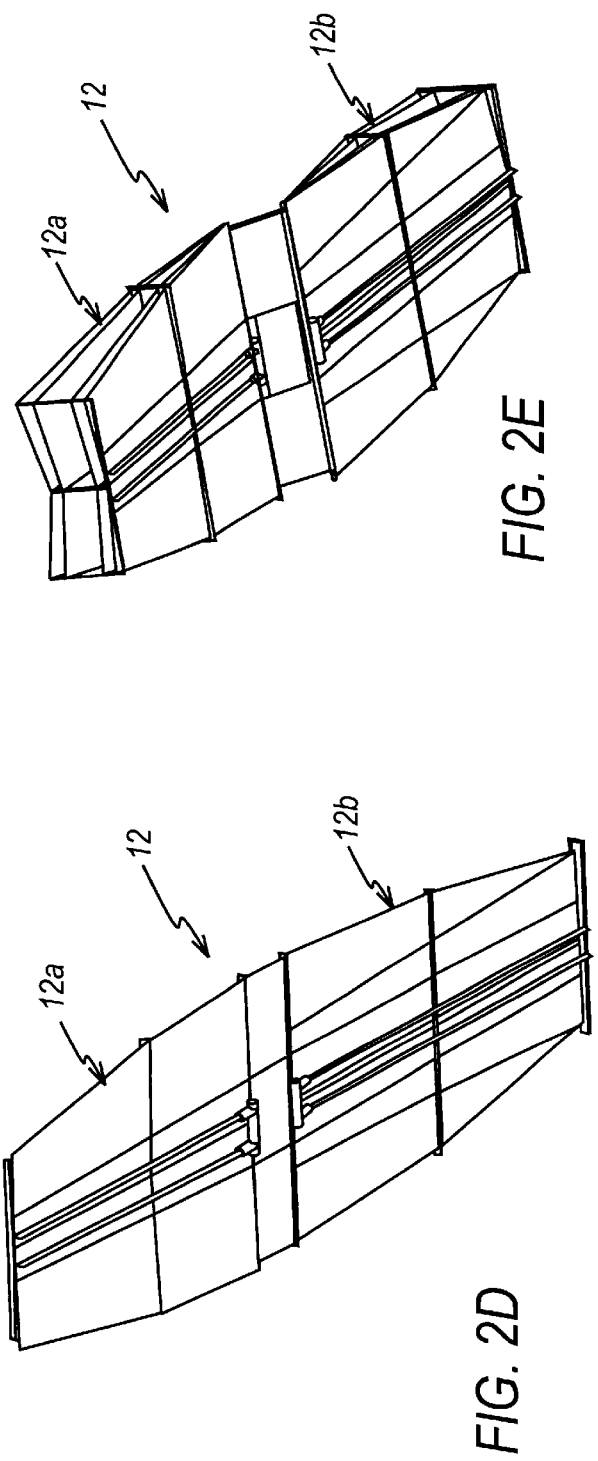

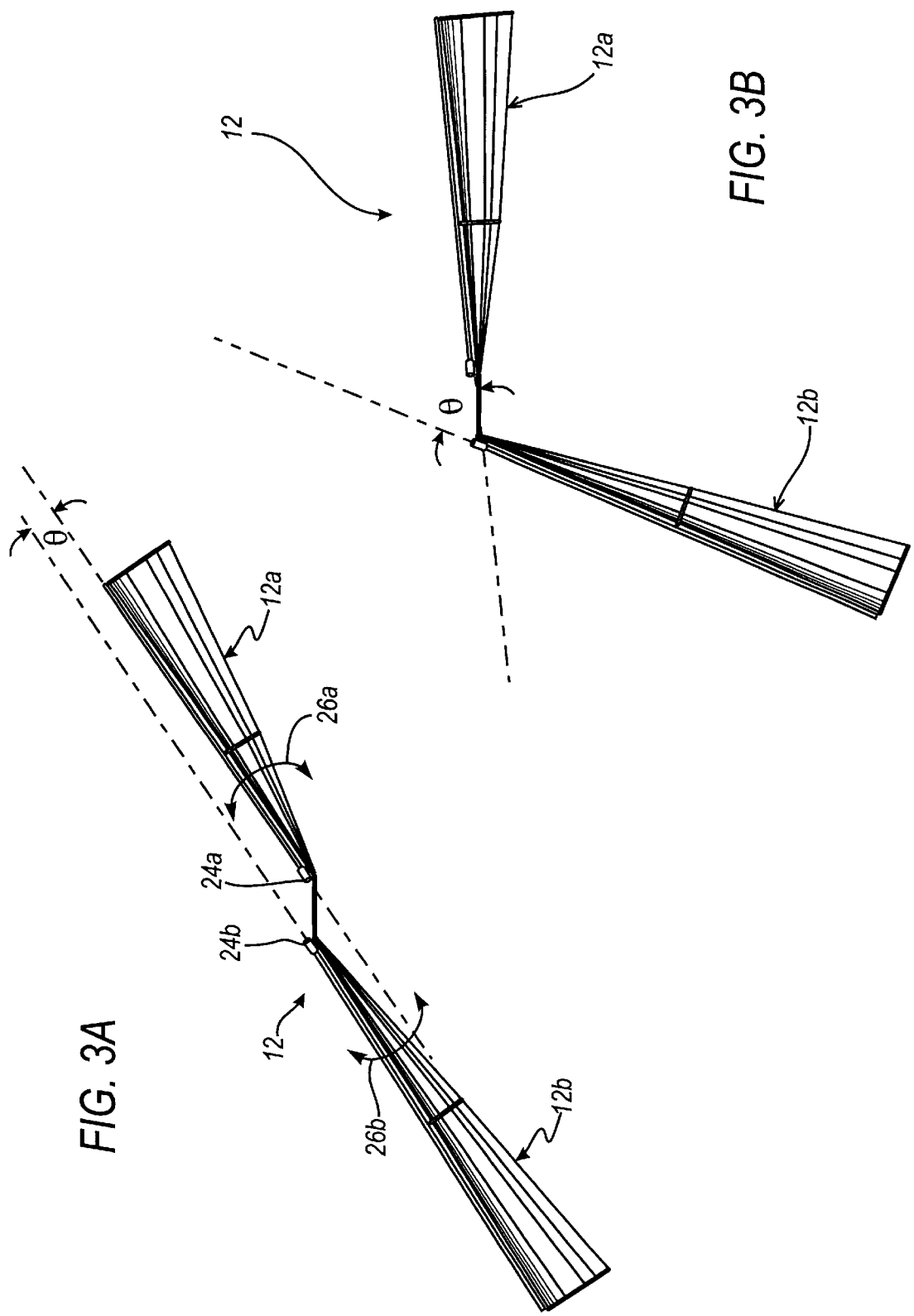

SPACECRAFT SUNSHIELD FOR USE IN PERFORMING SOLAR TORQUE BALANCING

FIELD OF THE INVENTION

The invention relates generally to space vehicles and, more particularly, to structures and techniques for maintaining a space vehicle in a desired orientation during propagation in space.

BACKGROUND OF THE INVENTION

A spacecraft orbiting about the Earth, sun, or other body, or on an interplanetary mission, must typically maintain a predetermined attitude (i.e., physical orientation) to perform the function for which the spacecraft was designed. For example, the spacecraft may need to maintain a particular attitude so that: (a) an antenna on the spacecraft is pointing toward a desired region, (b) observation instruments on the spacecraft are directed toward an object being observed, and/or (c) solar panels on the spacecraft receive radiation from the sun. However, a number of forces normally act upon a spacecraft that can, if ignored, alter the attitude of the spacecraft from its desired orientation. These forces include, for example, the force of gravity, forces generated by the earth's magnetic field, and solar pressures generated by the sun's radiation impinging upon the surfaces of the spacecraft. These forces can generate undesired torques on the spacecraft that tend to rotate the spacecraft from its desired orientation. To deal with such forces, attitude control systems have traditionally been implemented.

Attitude control systems commonly rely upon angular momentum storage devices, such as control moment gyroscopes and/or reaction wheels, to track and compensate for undesired torques acting upon a spacecraft. Such devices react to external torques by storing momentum in an amount that is directly proportional to the level of external torque that is being applied to the spacecraft. A reaction wheel, for example, is a device that counteracts an external torque being applied to a spacecraft by changing the rate of rotation of the reaction wheel about its axis. The additional torque generated by accelerating the reaction wheel counteracts the undesired external torque acting upon the spacecraft in a manner that maintains the desired spacecraft attitude. A control moment gyro also counteracts external torques by storing angular momentum. However, the control moment gyro stores momentum by tipping the spin axis of a rotating member rather than accelerating a wheel. In addition to attitude maintenance functions, angular momentum storage devices can also be used to temporarily change the attitude of a spacecraft during special maneuvers or operations.

Over time, the amount of angular momentum stored within an angular momentum storage device can approach an upper limit. Once this limit is reached, it is impossible for the device to appropriately react to new external torques being applied to the spacecraft. Thus, "momentum dumping" is periodically employed to reduce the amount of momentum stored within the angular momentum storage device. Typically, momentum dumping is performed using thrusters on the spacecraft to generate torques that, when compensated for by the momentum storage device(s), eliminate the stored momentum within the device(s). The use of thrusters to perform momentum dumping, however, consumes a relatively large amount of fuel in the spacecraft. Consequently, additional fuel must be stored on the spacecraft to perform the momentum dumping. In addition, the use of thrusters for momentum dumping typically generates orbit variations for the spacecraft that necessitate additional station keeping activity, thereby consuming additional fuel.

Therefore, there is a need for a method and apparatus that is capable of efficiently maintaining a desired attitude for a spacecraft. There is also need for a method and apparatus that is capable of providing momentum management within a spacecraft in an efficient manner. Preferably, the method and apparatus will reduce the reliance on thrusters to perform attitude control functions on the spacecraft.

SUMMARY OF THE INVENTION

The present invention relates to a sunshield subsystem or assembly for use on a spacecraft that is capable of providing thermal control for the spacecraft while simultaneously performing attitude control functions for the spacecraft. Use of the sunshield subsystem can significantly reduce or eliminate the need to employ thrusters for momentum control in the spacecraft. In one embodiment, the sunshield subsystem reduces thruster propellant usage for momentum dumping by an order of magnitude, thus reducing the amount of thruster propellant that must be stored on the spacecraft to a small fraction of the fuel needed for station keeping. In a preferred approach, the sunshield subsystem is implemented on a spacecraft that needs a sunshield to provide thermal control for an application being performed by the spacecraft (e.g., to protect optics on-board the spacecraft). However, the sunshield subsystem can also be implemented on spacecraft that do not require additional thermal control, especially if the particular spacecraft design is known to nominally generate significant solar torques. The inventive principles are most advantageously used by spacecraft that utilize an inertial reference (e.g., the sun or stars) as opposed to an earth reference.

The sunshield subsystem includes a pair of shield members that are capable of being moved with respect to one another while the spacecraft is propagating through space. This movement capability is used to balance the solar torques acting upon the spacecraft, thereby significantly reducing the amount of torque that needs to be compensated for by momentum storage devices within the spacecraft. In one embodiment, the shield members are nominally flat structures comprising a thin film material supported by a rigid frame structure. At least one of, and preferably both of, the shield members are mounted on a moveable joint that allows each member, either separately or together, to pivot about an axis of rotation, such as relative to a pitch direction or plane. A motor unit is provided that allows one or both of the members to be controllably positioned about the corresponding axis. The relative positions of the shield members are adjusted in space so that an appropriate dihedral angle exists between the members to achieve a neutral stability condition for the spacecraft. Typically, an initial adjustment of the dihedral angle will be made when the spacecraft is first deployed to compensate for any inaccuracies in the initial shield member positions. Then, periodic adjustments are made to the dihedral angle during the operational life of the spacecraft to compensate for, for example, changes in the reflectivity of the sunshield material over time or damage to the shield members.

In one aspect of the invention, a sunshield subsystem is provided that is capable of balancing solar torques on a spacecraft in three independent rotational planes or directions (i.e., pitch, yaw, and roll). To achieve this, the shield members are made highly maneuverable so that they can be adjusted into many different mechanical configurations. For example, in addition to the dihedral angle adjustment capability that is used to balance torque in the pitch direction, a twisting capability is provided in the shield members for use in balancing torques in the yaw direction and a "rooftop" capability is provided for use in balancing torques in the roll direction. A controller is also provided for measuring a current solar torque associated with the spacecraft and for appropriately adjusting the shapes of the shield members to compensate therefor.

In another aspect of the invention, the maneuverability of the shield members is used to perform momentum dumping. That is, the shape of the shield members is adjusted in a manner that will generate a solar torque on the spacecraft that will reduce the amount of momentum stored within the momentum storage devices on-board the spacecraft. In this manner, momentum dumping is achieved without expending any thruster propellant. This momentum dumping technique can be used by itself or a hybrid system can be implemented that uses both sunshield generated and thruster generated momentum dumping torques.

BRIEF DESCRIPTION OF THE DRAWINGS

FIGS. 2A–2E are diagrams illustrating deployment of the sunshield assembly of FIG. 1 in accordance with one embodiment of the present invention;

FIGS. 3A–3B are diagrammatic side views of an articulated sunshield assembly illustrating adjustments that can be made to a dihedral angle between two shield members in accordance with one embodiment of the present invention;

DETAILED DESCRIPTION

Figure 1:
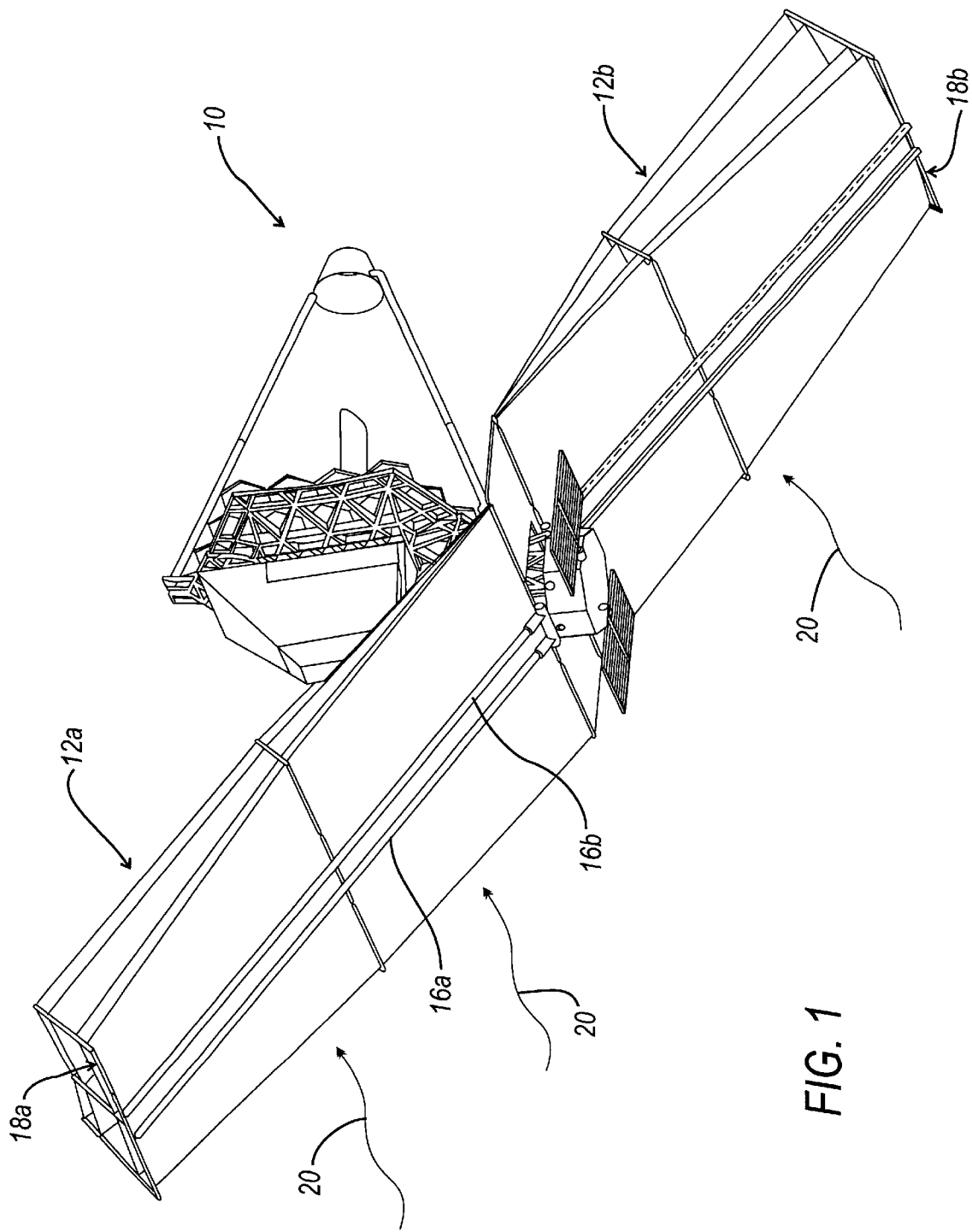
FIG. 1 is a diagram illustrating a spacecraft having a sunshield assembly in accordance with one embodiment of the present invention.

FIG. 1 illustrates a spacecraft 10 having a sunshield assembly 12 in accordance with one embodiment of the present invention. The spacecraft 10 also includes onboard optics equipment for use in observing, for example, a celestial body of interest. The sunshield assembly 12 is operative for, among other things, blocking solar radiation that would otherwise impinge upon the optics equipment. By blocking the solar radiation, the sunshield assembly 12 keeps the optics cool, thus improving the quality of the images captured by and extending the life of the optics. The sunshield assembly 12 is also operative for balancing solar torques acting upon the spacecraft 10. By accurately balancing the solar torques, the sunshield assembly 12 is able to reduce the amount of momentum that needs to be stored in on-board angular momentum storage devices and thus reduce the need for periodic momentum dumping using thrusters. In addition, in one aspect of the invention, the sunshield assembly 12 is adapted to perform momentum dumping functions, either alone or in conjunction with the on-board thrusters. As can be appreciated, the principles of the present invention are capable of significantly reducing the amount of fuel that must be carried on the spacecraft 10 for use in attitude control.

The spacecraft 10 observes the celestial body of interest using the on-board optics while the spacecraft 10 orbits about the earth (or another body) in a direction of propagation 28. While in orbit, the spacecraft 10 needs to maintain a predetermined orientation (i.e., attitude) so that the optics are continually pointing in the proper direction. As will be described in greater detail, the spacecraft 10 includes an attitude control system for controlling the attitude of the spacecraft 10 during the operational lifetime thereof. The sunshield assembly 12 is designed so that the optics will be in the shade of the sunshield assembly 12 whenever the spacecraft 10 is in the proper orientation.

It is well known that solar radiation impinging upon a surface generates a physical pressure upon that surface. Thus, when the sun's rays impinge upon the external surfaces of a spacecraft, solar pressures are exerted thereon. The amount of pressure exerted at a particular point on the spacecraft's surface depends upon, among other things, the intensity of the solar radiation striking that point, the angle at which the solar radiation strikes that point, and the reflective properties of the material at that point. A "center of pressure" is defined on the spacecraft indicating a point about which the effective solar pressures on the spacecraft are balanced.

A stable spacecraft orientation is achieved when the center of pressure lies along a line running between the sun and the spacecraft center of mass. If the center of pressure is not along this line, solar torques will exist on the spacecraft that will tend to rotate the spacecraft about the center of mass. A positive stability condition is said to exist when the center of pressure is aft of the spacecraft center of mass (i.e., on the opposite side from the sun). A negative stability condition is said to exist when the center of pressure is between the sun and the spacecraft center of mass. A neutral stability condition is said to exist when the center of pressure is co-located with the spacecraft center of mass. When a neutral stability condition exists, the solar torque on the spacecraft is balanced over a relatively large range of spacecraft orientation angles with respect to the sun. Thus, even if undesired attitude variations occur during the lifetime of the spacecraft, solar torque creation during those variations will be minimal. Therefore, it is desirable to maintain the spacecraft in a neutral stability condition over its entire operative lifetime.

Referring back to FIG. 1, the sunshield assembly 12 includes a pair of shield members 12a, 12b that project in opposite directions from a central portion of the spacecraft 10. In the illustrated embodiment, each of the shield members 12a, 12b is a relatively flat, rectangular structure that is designed to block the transmission of solar radiation 20 to the optics of the spacecraft 10. It should be appreciated, however, that the individual shield members can take a variety of different shapes in accordance with the present invention and the specific shapes illustrated are not meant to be limiting. In a preferred approach, the shield members 12a, 12b each include one or more layers of a reflective thin film material supported by a rigid frame structure. The thin film material is preferably lightweight, flexible, and solar radiation tolerant. In one embodiment, for example, a thin aluminized Kapton material having a thickness of 0.5 mm is used as a thin film material. One such material is sold as a thermal control laminate by Sheldahl. Other possible materials include, for example, silverized Teflon and aluminized Mylar. As illustrated in FIGS. 2A–2E, the shield members 12a, 12b are each stowed in and around the spacecraft 10 during launch and are then deployed in space via articulating struts, telescoping booms such as booms 16a, 16b, and/or inflatable tubes. Spreader bar mechanisms 18a, 18b are used to spread out the thin film material during the deployment process.

FIGS. 3A–3B are simplified side views of the sunshield assembly 12 illustrating the attachment of the shield members 12a, 12b to a central portion 22 of the spacecraft 10 in one embodiment of the present invention. As illustrated, each of the shield members 12a, 12b is attached to the central portion 22 using a rotatable member or joint 24a, 24b that allows the respective members 12a, 12b to each be independently pivoted 26a, 26b about a corresponding axis of rotation. In addition, one or more sunshield motors 38 is coupled to each shield member 12a, 12b for use in controllably positioning the corresponding shield member about its axis of rotation. In a preferred embodiment, the root of each main deployed strut is mounted on a motor that is capable of articulating the boom of the corresponding shield member through a wide range of angles. The axes of rotation of the two shield members 12a, 12b are preferably parallel to one another so that movement of either one of the two members about a corresponding axis will change a dihedral angle θ between the two shield members 12a, 12b. In an alternative approach, only one of the shield members 12a, 12b is controllably movable and the other is fixedly attached to the spacecraft 10.

Figure 4:
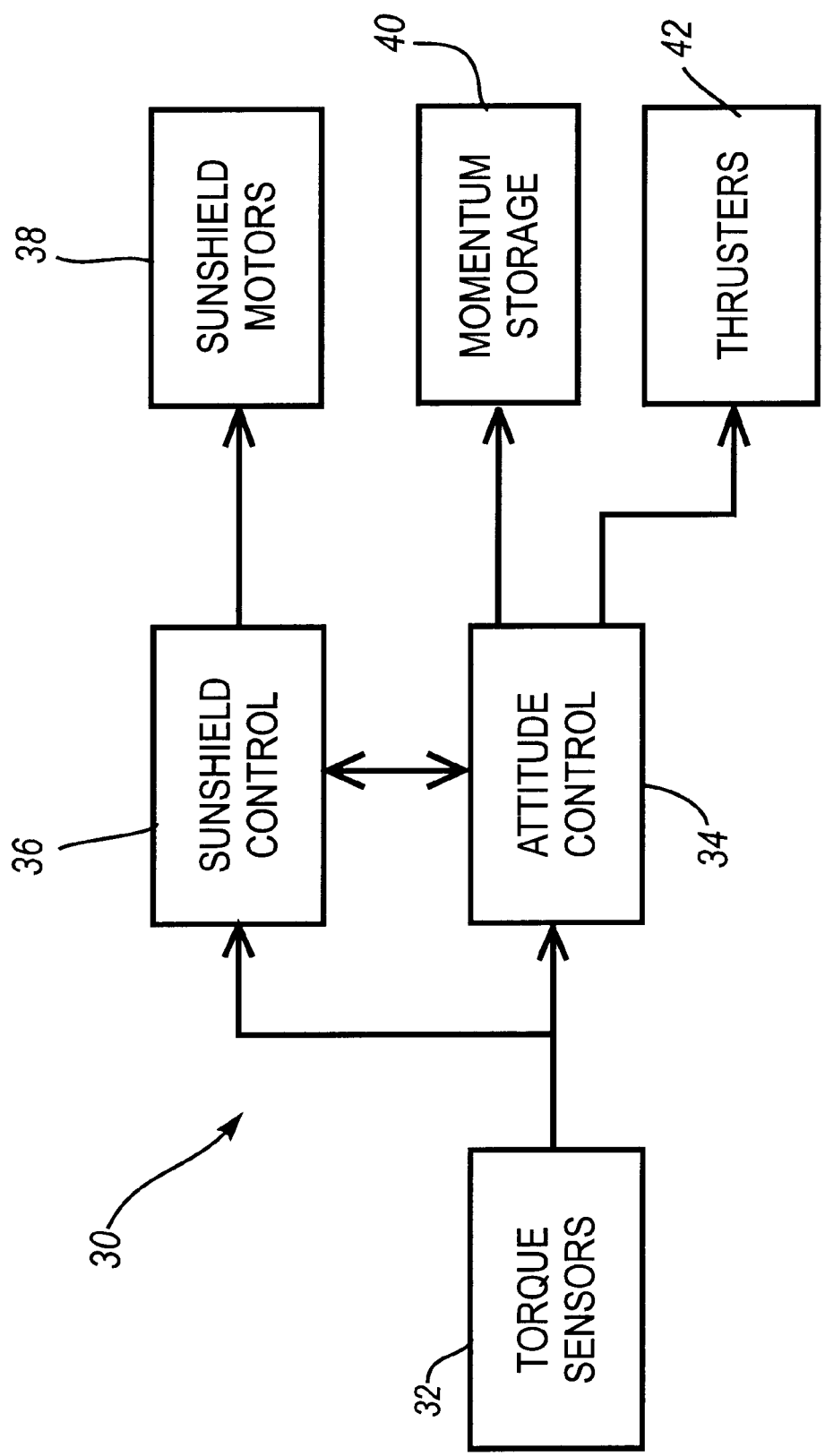
FIG. 4 is a block diagram illustrating a control system for use within a spacecraft in accordance with one embodiment of the present invention.

FIG. 4 is a block diagram illustrating a control system 30 that can be used to control the attitude of the spacecraft 10 of FIG. 1 in accordance with one embodiment of the present invention. As illustrated, the control system 30 includes: torque sensors 32, an attitude control unit 34, a sunshield control unit 36, a pair of sunshield motors 38, at least one momentum storage device 40, and a plurality of thrusters 42. The torque sensors 32 are operative for sensing external torques on the spacecraft 10 that tend to change the orientation of the spacecraft 10 from the desired attitude. The torque sensors 32 can include any device that is capable of detecting and measuring external torques applied to the spacecraft 10 including, for example, gyroscopes, star trackers, and fine guidance sensors.

The attitude control unit 34 is operative for responding to the sensed torques by changing the amount of momentum stored within the momentum storage devices 40 to counteract the effects of the external torques. In a preferred embodiment, the attitude control unit 34 is implemented in software within an on-board digital processing device. The momentum storage devices 40 can include, for example, reaction wheels, control moment gyros, or similar devices. The thrusters 42 are propulsion units that can be used by the attitude control unit 34 to periodically dump the momentum stored within the momentum storage devices 40. As will be described in greater detail, in one embodiment of the invention, the attitude control unit 34 can optionally use the sunshield assembly 12 to perform momentum dumping for the spacecraft 10 in addition to, or as an alternative to, use of the thrusters 42.

The sunshield control unit 36 is operative for controlling the mechanical configuration of the shield members 12a, 12b by generating appropriate control signals for delivery to the sunshield motors 38. Like the attitude control unit 34, the sunshield control unit 36 is preferably implemented in software within an on-board processor. The sunshield control functionality can be implemented within the same processor as the attitude control functionality or a different on-board processor can be provided. Alternatively, some of the sunshield control functionality can be provided on the ground with sunshield adjustments being made by wireless link to the spacecraft 10. The sunshield control unit 36 receives the external torque information from the torque sensors 32 and uses this information to adjust the sunshield configuration. The sunshield control unit 36 is preferably in communication with the attitude control unit 34 so that the activities of the two units can be coordinated.

In one aspect of the present invention, the sunshield control unit 36 is used to maintain the spacecraft 10 in a neutral stability condition throughout its lifetime. In one approach, the sunshield control unit 36 does this by periodically adjusting the dihedral angle θ between the shield members 12a, 12b (see FIG. 3) in response to a torque condition detected by the torque sensors 32. The shield members 12a, 12b are designed to provide positive stability for a nominal sunshield orientation. By adjusting the dihedral angle θ, the sunshield control unit 36 is able to move the center of pressure on the spacecraft along the sun-center of mass line to the position of the center of mass. This typically requires a relatively shallow angle. Once the neutral stability condition is achieved, a balanced condition then exists over a large range of viewing angles.

The sunshield assembly 12 is preferably designed so that the shield members 12a, 12b are properly positioned after deployment to achieve a neutral stability condition. However, irregularities, manufacturing inconsistencies, or deployment errors may cause a situation where an initial adjustment is necessary after deployment. Thus, in one embodiment of the invention, the sunshield control unit 36 is programmed to perform an initial adjustment to the positions of the shield members 12a, 12b just after sunshield deployment when the spacecraft 10 is first put into orbit. Re-adjustments are then performed regularly during the life of the spacecraft 10 as, for example, the surface properties of the shield members degrade or damage occurs changing the reflectivity and/or absorptivity of the film surface.

If thrusters are used to perform momentum dumping on the spacecraft, adjustments in the dihedral angle between the shield members 12a, 12b (usually <0.3 degrees) will typically be made between 1 and 4 times per year. With an average mission lasting between 5 and 10 years, this results in approximately 5–40 adjustments being made over the operative life span of the spacecraft. If thrusters are not provided on the spacecraft, the number of adjustments will normally be much larger. In one approach, for example, daily angle adjustments are made so that approximately 3650 adjustments are made over the life of the spacecraft 10. These adjustments will typically be smaller in magnitude (e.g., <0.1 degree) than the less frequent adjustments described above. Even if thrusters are provided on the spacecraft, more frequent sunshield assembly 12 adjustments can still be made to reduce the number of thruster firings that are required during the life of the spacecraft. As can be appreciated, a reduction in the number of thruster firings reduces the amount of thruster fuel that needs to be provided on the spacecraft and also lowers concern regarding contamination on the optics and the sunshield assembly 12. In addition, interruptions to imaging operations are significantly decreased through the provision of continual, low-level, low disturbance momentum management.

In one aspect of the present invention, a sunshield assembly 12 is provided that is capable of balancing torques in multiple independent rotational planes simultaneously. In one embodiment, for example, the sunshield assembly 12 is capable of simultaneously, or at different times, balancing solar torques in each of the roll, pitch, and yaw planes or directions. Balancing in pitch is accomplished by adjusting the dihedral angle between the shield members 12a, 12b as described above. Balancing in the yaw plane is accomplished by control lably twisting each of the shield members a predetermined amount based on a present solar torque condition. Balancing in the roll plane is accomplished by controllably positioning the centerline of each shield member (along the longitudinal axis) up or down relative to the edges (i.e., to create a "rooftop" effect) based on a current torque condition.

Figure 5:
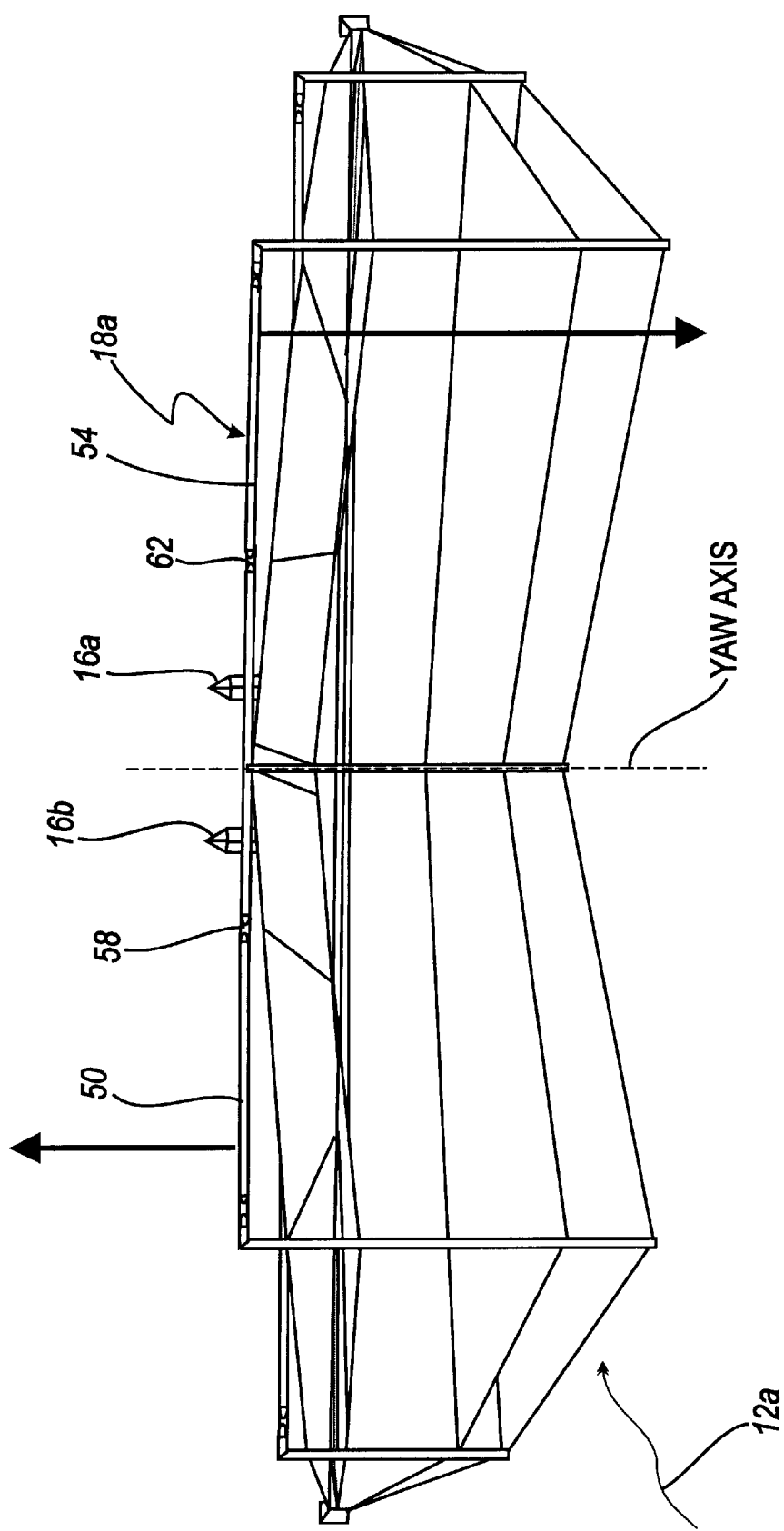
FIG. 5 is a diagram illustrating a twisted shield member that is used to balance solar torques in the yaw plane in accordance with one embodiment of the present invention.

FIG. 5 diagrammatically illustrates the application of forces to a sunshield assembly 12 in conjunction with balancing solar torques in a yaw direction or along a yaw plane. The balancing of, or otherwise responding to, solar torques can be accomplished by applying or creating opposing forces to different sections of the same shield member 12a and/or shield member 12b. As depicted by the arrow heads extending in opposite directions in FIG. 5, opposing forces are provided adjacent to the lateral edges of the shield member 12a. These opposing forces tend to cause portions of the shield member 12a to move relative to the yaw axis. The yaw axis is perpendicular to the longitudinal extent of the shield member 12a and is also parallel to the directions of these forces.

In one embodiment, such forces are generated using the spreader bar mechanism 18a. The mechanism 18a includes first and second spreader bars 50, 54. First and second hinge members 58, 62 are provided adjacent to one end of the spreader bars 50, 54, respectively. The hinge members 58, 62 enable desired movement of the spreader bars 50, 54 to occur. With regard to creating the opposing upward and downward forces associated with the shield member 12a, the spreader bar 50 is caused to move relative to the hinge member 58 in the upward direction. The spreader bar 54 is caused to move in the downward movement relative to the hinge member 62. Such movements relative to the respective hinge members 58, 62 can be accomplished using one or more of the sunshield motors 38. With such upward and downward movements relative to these hinge members 58, 62, at least portions of the shield member 12a are cause to rotate or otherwise move about the yaw axis. Such a "spinning" about the yaw axis causes a propeller type motion. Moving the tips of the spreader bars 50, 54 in the directions of the arrows is like feathering an airplane propeller so that it pushes more or less air. In so doing, solar torques that cause an unbalancing associated with the yaw direction or yaw plane can be compensated for or balanced.

Figure 6:
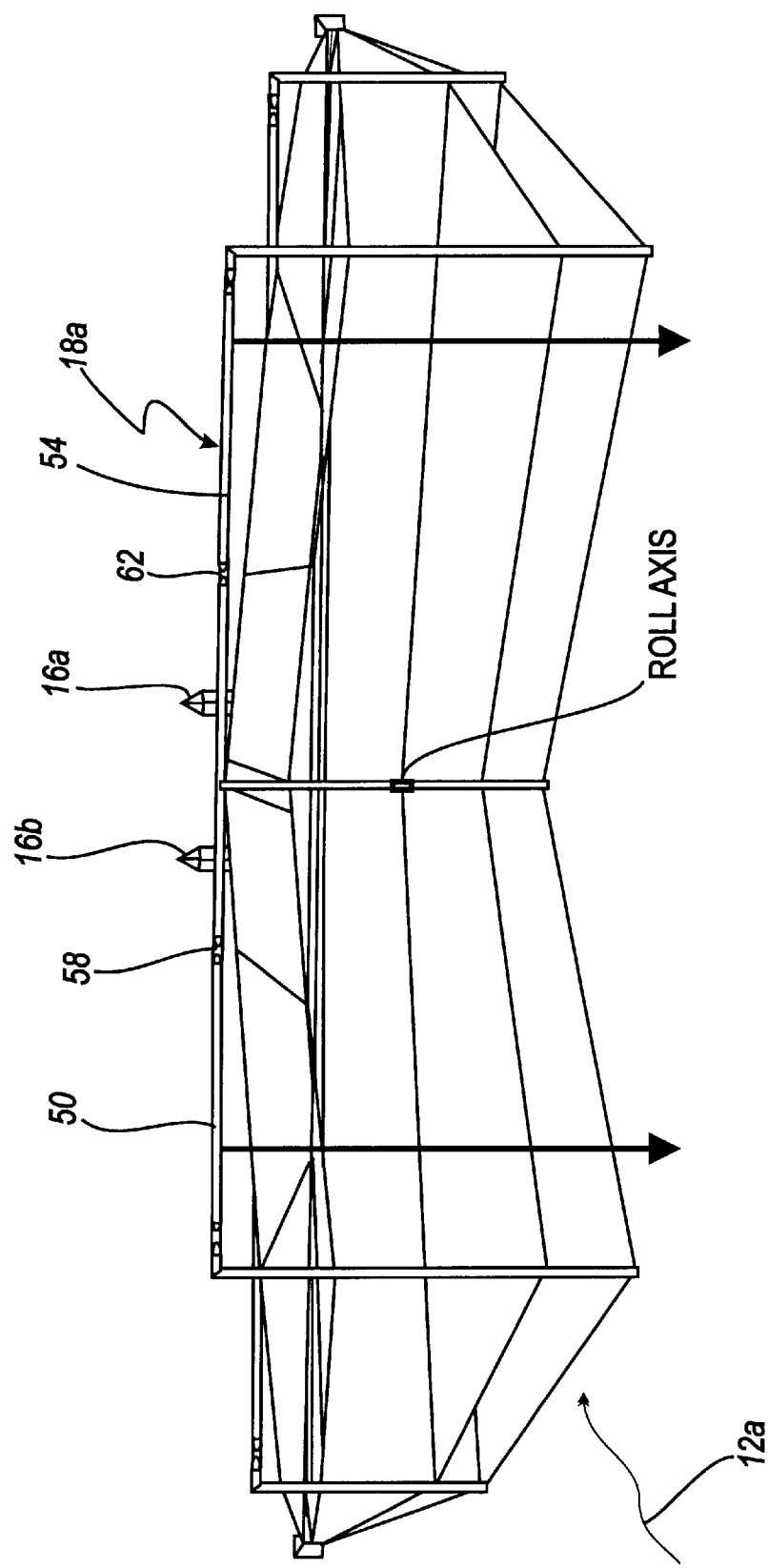
FIG. 6 is a diagram illustrating a shield member having a raised centerline that is used to balance solar torques in the roll plane in accordance with one embodiment of the present invention.

With reference to FIG. 6, a description is next provided concerning the balancing of solar torques associated with a roll plane or direction. As seen in FIG. 6, a roll axis is defined into the paper that illustrates FIG. 6. The roll axis is perpendicular to the longitudinal extent of the shield member, perpendicular to the vertical axis (along the height of the shield member 12a) and also perpendicular to the arrows illustrating these forces. To compensate for such solar torques, forces are applied or created in the same direction adjacent to lateral edges of the two sections of the shield member 12a. Application of such forces tends to cause movement of at least portions of the shield member 12a relative to or about the roll axis. That is, if there was movement about the roll axis, the embodiment of FIG. 6 would "spin" clockwise (or counterclockwise) on the paper that has the FIG. 6 illustration. This occurs if one side of both the aft and forward sunshield member are moved in the arrow(s) direction. With regard to creating these balancing or compensating forces, one of the two spreader bars 50, 54 is rotated in a clockwise direction, while the other of the two spreader bars 50, 54 is caused to rotate in the counter-clockwise direction. These rotational directions of movement can be accomplished using one or more of the sunshield motors 38 that cause the spreader bars 50, 54 to have the rotational direction of movement relative to their respective hinge members 58, 62. Consequently, rotation of the spreader bar 50, for example, in a clockwise direction and rotation of the spreader bar 54 in a counter-clockwise direction results in movements of the shield member 12a relative to the roll axis.

With respect to the magnitudes of movements by one or both of the shield members 12a, 12b relative to the yaw axis and/or roll axis, the sunshield control unit 36 controls activation of one or more of the sunshield motors 38 to cause the necessary movements of the spreader bars 50, 54. In that regard, the sunshield control unit 36 can include a look up table, equation, a graph, or other model, that it relies on in determining the amount of balancing or compensating force or forces to be applied. That is, for a detected solar torque associated with a particular axis, plane or direction, such information can be correlated with the magnitude or amount of the force or forces that are to be applied to balance such a solar torque. Once the balancing magnitude is determined by the control unit 36, it can then apply one or more appropriate control signals to one or more of the sunshield motors 38, for example, to move one or both of the sunshield members 12a, 12b, or at least portions of one or both of them.

In another aspect of the present invention, the sunshield assembly 12 is used to perform momentum dumping for the spacecraft 10. That is, means are provided for changing the orientation of the sunshield assembly 12 (e.g., the dihedral angle between the two shield members 12a, 12b, etc.) to reduce the amount of momentum stored in the momentum storage devices on-board the spacecraft 10. One or both of the shield members 12a, 12b is reconfigured to generate a solar torque that, when compensated for by the momentum storage devices, reduces or eliminates the angular momentum stored therein. This technique can be used to dump stored momentum in any of the three rotational planes (i.e., roll, pitch, and yaw) using the principles described above. In a typical implementation, the sunshield assembly 12 is set with a pressure bias for performing the momentum dumping.

Although the present invention has been described in conjunction with its preferred embodiments, it is to be understood that modifications and variations may be resorted to without departing from the spirit and scope of the invention as those skilled in the art readily understand. For example, the inventive principles can be used with virtually any type of space vehicle and are not limited to use with vehicles such as those disclosed herein. Such modifications and variations are considered to be within the purview and scope of the invention and the appended claims.

What is claimed is:

1. A method for deploying at least a first shield member connected to a spacecraft body, comprising:

providing a spacecraft that includes a spacecraft body and at least a first shield member connected to said spacecraft body; and deploying said first shield member relative to said spacecraft body in space including substantially co-locating a center of mass of said spacecraft with a solar radiation center of pressure in each of a pitch direction, a yaw direction and a roll direction by at least using movement of at least first portions of said first shield member about at least one of a pitch axis, a yaw axis and a roll axis to achieve a neutral stability condition of said spacecraft, said center of pressure indicating substantially a point on said spacecraft about which effective solar pressures are balanced.

2. A method, as claimed in claim 1, further including:

after said deploying step, detecting a solar torque applied to said spacecraft due to at least one of degradation of a surface property of said first shield member and change in reflectivity associated with said first shield member; and adjusting at least second portions of said first shield member about at least one of said pitch axis, said yaw axis and said roll axis.

3. A method, as claimed in claim 2, wherein:

said first shield member is part of a sunshield assembly that includes a second shield member, a dihedral angle being defined between said first shield member and said second shield member, said adjusting step includes changing said dihedral angle in substantially co-locating said spacecraft center of pressure generated by said solar torque with said center of mass of said spacecraft.

4. A method for adjusting a sunshield assembly connected to a spacecraft body, comprising:

providing a spacecraft that includes a spacecraft body and a sunshield assembly having at least a first shield member and a second shield member connected to said spacecraft body, said first shield member including a first spreader bar and said second shield member including a second spreader bar;

deploying said sunshield assembly relative to said spacecraft body in space;

detecting a solar torque applied to at least portions of said spacecraft; and adjusting said first shield member in response to said solar torque, said adjusting step including:
moving said first shield member relative to said second shield member about a pitch axis;
applying a first force to said first shield member and a second force to said second shield member, said second force being in a direction substantially opposite the direction of said first force, wherein said first shield member is caused to move relative to a yaw axis and in which said first and second spreader bars are caused to move in substantially opposite directions in responding to solar torque applied in substantially a yaw direction.

5. A method, as claimed in claim 4, wherein:

said adjusting step includes applying a third force to said first shield member and applying a fourth force to said second shield member, said third and fourth forces being applied in substantially the same direction.

6. A method for adjusting a sunshield assembly connected to a spacecraft body, comprising:

providing a spacecraft that includes a spacecraft body and a sunshield assembly having a first shield member and a second shield member connected to said spacecraft body, said first shield member including a first spreader bar and said second shield member including a second spreader bar;

deploying said sunshield assembly relative to said spacecraft body in space;

detecting a solar torque applied to at least portions of said spacecraft; and adjusting said first shield member in response to said solar torque, said adjusting step including:
moving said first shield member relative to said second shield member about a pitch axis;
applying a first force to said first shield member and a second force to said second shield member, said second force being in a direction substantially opposite the direction of said first force, wherein said first shield member is caused to move relative to a yaw axis; and
applying a third force to said first shield member and applying a fourth force to said second shield member, said third and fourth forces being applied in substantially the same direction, said steps of applying said third force and applying said fourth force include causing said first spreader bar to rotate in a first rotational direction and said second spreader bar to rotate in a second rotational direction, opposite said first rotational direction, and wherein at least said first shield member is caused to move about a roll axis, said roll axis being substantially perpendicular to each of said pitch axis and said yaw axis.

7. A method, as claimed in claim 2, further including:

using at least a first momentum storage device in responding to said solar torque; and dumping momentum using movement of said first shield member after buildup of solar torque in said first momentum storage device.

8. A spacecraft comprising:

a spacecraft body;

at least a first shield member coupled to said spacecraft body for shielding at least a portion of said spacecraft body from solar radiation, said first shield member having a mechanical configuration that is adjustable with respect to said spacecraft body;

a torque measurement device for determining solar torques associated with said spacecraft; and a controller that makes determinations related to substantially co-locating a center of mass of the spacecraft with a solar radiation center of pressure in each of a pitch direction, a yaw direction and a roll direction based on said solar torques determined by said torque measurement device, said solar radiation center of pressure indicating substantially a point on the spacecraft about which effective solar pressures on the spacecraft are balanced.

9. A spacecraft, as claimed in claim 8, wherein:

said first shield member is part of a sunshield assembly that includes a second shield member, wherein said controller controls adjustment of a dihedral angle defined between said first and second shield members.

10. A spacecraft, as claimed in claim 8, wherein:

said first shield member comprises a flexible film material carried by a rigid support structure.

11. A spacecraft, as claimed in claim 8, further comprising:

an angular momentum storage device for use in maintaining a desired orientation of the spacecraft by varying an amount of angular momentum stored therein, wherein said controller controls adjustment of said mechanical configuration of said first shield member to reduce an amount of angular momentum stored in said angular momentum storage device.

12. A spacecraft, as claimed in claim 8, wherein:

said controller controls adjustment of said mechanical configuration of said first shield member by moving said first shield member relative to a pitch axis associated therewith, by moving said first shield member relative to said yaw axis associated therewith and by moving said first shield member relative to said roll axis associated therewith.

13. A spacecraft comprising:

a spacecraft body;

a sunshield assembly having a first shield member and a second shield member and coupled to said spacecraft body for shielding at least a portion of said spacecraft body from solar radiation, said sunshield assembly having a mechanical configuration that is adjustable with respect to said spacecraft body, said first shield member including a first spreader bar mechanism that includes a first hinge member and said second shield member includes a second spreader bar mechanism that includes a second hinge member, said first and second shield members also including first and second pivotal members, respectively;

a torque measurement device for determining solar torques associated with said spacecraft; and a controller for adjusting said mechanical configuration of said sunshield assembly based on said solar torques determined by said torque measurement device, said controller controlling adjustment of said mechanical configuration by moving said first shield member relative to a pitch axis associated therewith, by moving said first shield member relative to a yaw axis associated therewith and by moving said first shield member relative to a roll axis associated therewith, wherein said controller controls movement of said first shield member using said first pivotal member, said controller controls movement of said first spreader bar mechanism using said first hinge member in a direction about said yaw axis, and said controller controls movement of said first spreader bar mechanism in a rotational direction to cause pivotal movement relative to said roll axis.

14. A method, as claimed in claim 1, wherein:

said deploying step includes applying opposing forces to different sections of said first shield member in co-locating said spacecraft center of mass with said solar radiation center of pressure in said yaw direction.

15. A method, as claimed in claim 14, wherein:

said deploying step includes using a spreader bar mechanism that includes at least a first spreader bar and a first hinge member, wherein said first spreader bar is caused to move in one of an upward direction and a downward direction relative to said first hinge member.

16. A method, as claimed in claim 1, wherein:

said deploying step includes applying forces in the same direction adjacent to two sections of said first shield member in co-locating said spacecraft center of mass with said solar radiation center of pressure in said roll direction.

17. A method, as claimed in claim 16, wherein:

said first shield member includes first and second spreader bars and said deploying step includes rotating said first spreader bar in a clockwise direction and rotating said second spreader bar in a counter-clockwise direction.

18. A spacecraft, as claimed in claim 8, wherein:

said first shield member includes a first spreader bar and a first hinge member and in which said first spreader bar moves in one of an upward direction and a downward direction relative to said first hinge member in co-locating said spacecraft center of mass with said center of pressure in said yaw direction.

19. A spacecraft, as claimed in claim 8, wherein:

forces are applied in the same direction adjacent to two sections of said first shield member in co-locating said center of mass with said center of pressure in said roll direction.

20. A spacecraft, as claimed in claim 19, wherein:

said first shield member is part of a sunshield assembly that includes a second shield member, said first shield member includes a first spreader bar and said second shield member includes a second spreader bar and in which said controller causes said first and second spreader bars to rotate in opposite directions.

* * * * *